No. 774,418. PATENTED NOV. 8, 1904.
H. L. FINLEY & S. C. BAUGHN, Jr.
NUT LOCK.
APPLICATION FILED APR. 1, 1904.
NO MODEL.
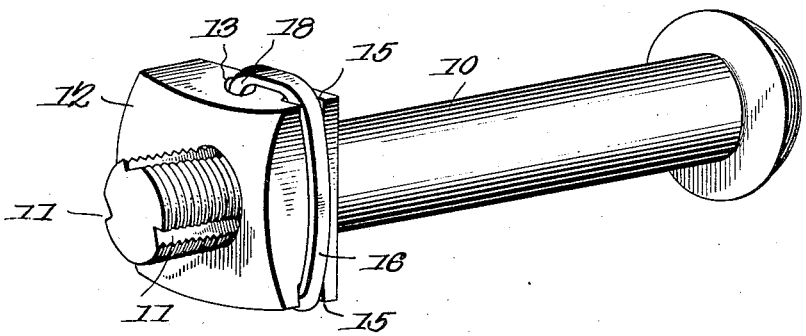
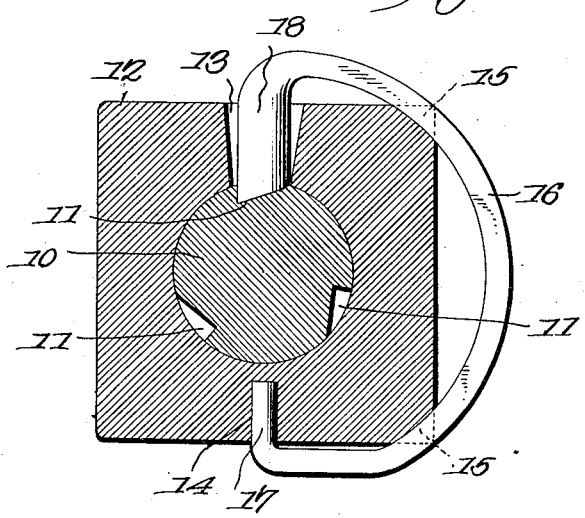
Witnesses
Henry L. Finley
Samuel C. Baughn, Jr.
Inventors
by C. A. Snow & Co.
Attorneys No. 774,418.

Patented November 8, 1904.

UNITED STATES PATENT OFFICE.

HENRY L. FINLEY AND SAMUEL C. BAUGHN, JR., OF BERTRAND, MISSOURI; SAID BAUGHN, JR., ASSIGNOR TO SAID FINLEY.

NUT-LOCK.

SPECIFICATION forming part of Letters Patent No. 774,418, dated November 8, 1904.

Application filed April 1, 1904. Serial No. 201,106. (No model.)

*To all whom it may concern:*

Be it known that we, HENRY L. FINLEY and SAMUEL C. BAUGHN, Jr., citizens of the United States, residing at Bertrand, in the county of Mississippi and State of Missouri, have invented a new and useful Nut-Lock, of which the following is a specification.

This invention relates to devices for preventing nuts from turning backwardly upon bolts, and has for its object to simplify and improve the construction and produce a device of this character which may be readily applied to any form of bolt and nut in ordinary use without material change in the structure or weakening the holding power of either.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a perspective view of a bolt and its nut with the improvement applied. Fig. 2 is a transverse section, enlarged, through the nut and bolt.

In the improved device the bolt 10 is provided with one or more longitudinally-disposed grooves 11, preferably inclined or tangential of the bolt on one side and radially thereof on the other side.

The nut 12, which may be of any of the usual forms employed, is provided on one side with a transverse aperture 13, communicating with its threaded interior, and in one of its sides, preferably diametrically opposite, a recess 14 is formed. The corners of the nut which come between the recess 14 and aperture 13 are provided with cavities 15, arranged in alinement with the recess and aperture. A spring 16 engages the cavities 15, said spring being provided at one end thereof with a stud 17 for engagement with the recess 14 and at its opposite end with a pawl 18, which passes through the aperture 13 and engages one of the channels 11 in the bolt. The portion of the spring 16 between the cavities 15 is curved outwardly away from the adjacent face of the nut. By this simple means it is obvious that the resilient force of the spring will maintain the pawl end 18 normally in its inward position and in engagement with one of the channels 11 in the bolt, and thus hold the nut locked to the bolt with sufficient force to prevent retrograde movement, but which may be readily released by inward pressure imparted to the outwardly-curving intermediate portion of the same. The inner or operative end of the pawl 18 is inclined on one side, so that it will click over the inclined side of the groove 11 and permit the nut to be turned freely in one direction, but will effectually lock it from movement in the opposite direction. The cavities 15 assist in holding the spring in position and prevent accidental displacement of the latter.

By this simple means it is obvious that an inexpensive, easily-applied, and efficient locking means between the nut and bolt is provided which may be applied to any size or form of nut and bolt.

By providing a plurality of the longitudinal channels 11 the pawl 18 may be applied at one of several points in each revolution of the nut, so it may be locked at any point desired, which construction may be necessary when employed upon some classes of structures.

Having thus described the invention, what is claimed is—

1. In a nut-locking device, a bolt having a plurality of longitudinal grooves, a nut provided with oppositely-disposed transverse recesses, and a spring provided at one end with a pawl for engaging the grooves in the bolt through one of said recesses and at its opposite end with a stud seated in the opposite recess, the intermediate portion of the spring being curved outwardly and spaced from the side of the nut whereby the nut is yieldably locked from rotation on said bolt and releasable by pressure applied to the outwardly-curved portion of the spring.

2. In a nut-locking device, a bolt having a plurality of longitudinally-disposed grooves, a nut having a transverse aperture on one side thereof communicating with its threaded interior and provided with a transverse peripheral recess spaced from said aperture, said nut having cavities in its corners between said recess and aperture, and a spring movably engaging said cavities and provided at one end thereof with a pawl for engaging the grooves in said bolt through said aperture and at its opposite end with a stud for engagement with said spaced recess, the intermediate portion of the spring between said cavities being curved outwardly from the face of the nut.

3. In a nut-locking device, a bolt having a plurality of longitudinally-disposed grooves, a nut having a transverse aperture on one side thereof communicating with its threaded interior and provided with cavities in its corners, and a spring movably engaging said corner-cavities and provided at one end with means for attachment to the nut and at its opposite end with a pawl extending through said aperture and engaging the grooves in the bolt, the intermediate portion of said spring between the corner-cavities being curved outwardly from the adjacent face of the nut.

In testimony that we claim the foregoing as our own we have hereto affixed our signatures in the presence of two witnesses.

HENRY L. FINLEY.
  SAMUEL C. BAUGHN, JR.

Witnesses:
 JOHN CUNNINGHAM,
 R. L. STINNETT.